(12) United States Patent
Sylvain (10) Patent No.: US 9,237,239 B2
(45) Date of Patent: Jan. 12, 2016

(54) METHOD FOR AUGMENTING A VOICE CALL

(75) Inventor: Dany Sylvain, Gatineau (CA)

(73) Assignee: Genband US LLC, Frisco, TX (US)

( * ) Notice: Subject to any disclaimer, the term of this patent is extended or adjusted under 35 U.S.C. 154(b) by 756 days.

(21) Appl. No.: 12/860,588

(22) Filed: Aug. 20, 2010

(65) Prior Publication Data

US 2012/0045046 A1    Feb. 23, 2012

(51) Int. Cl.

| | |
|---|---|
| *H04L 29/06* | (2006.01) |
| *H04L 29/12* | (2006.01) |
| *H04L 29/08* | (2006.01) |
| *H04M 3/42* | (2006.01) |
| *H04M 15/06* | (2006.01) |
| *H04M 7/00* | (2006.01) |

(52) U.S. Cl.
CPC .............. *H04M 7/0012* (2013.01); *H04M 3/42* (2013.01); *H04M 2207/12* (2013.01); *H04Q 2213/1305* (2013.01); *H04Q 2213/13091* (2013.01); *H04Q 2213/13103* (2013.01); *H04Q 2213/13178* (2013.01); *H04Q 2213/13201* (2013.01); *H04Q 2213/13337* (2013.01); *H04Q 2213/13375* (2013.01); *H04Q 2213/13389* (2013.01)

(58) Field of Classification Search
CPC .......... H04M 3/42042; H04M 3/5191; H04M 3/42068; H04M 7/0057; H04M 3/519; H04M 3/42; H04M 2203/2011; H04M 1/575; H04Q 3/74; H04L 65/1096; H04L 65/1083; H04L 12/2876; H04L 12/66; H04L 67/1069; H04L 61/157; H04L 61/1594; H04L 61/15; H04L 51/063; H04L 65/1069; H04L 12/5835; H04L 12/5825; H04L 51/06

USPC ................................. 370/352–356, 259, 271; 379/201.01–207.02, 142.07, 142.06, 379/142.15, 15.02, 15.03, 142.04, 220.01, 379/114.28, 120, 157, 88.19, 88.17, 379/265.09; 709/227–232; 455/414.1, 557, 455/556.1, 556.2

See application file for complete search history.

(56) References Cited

U.S. PATENT DOCUMENTS

| | | | | |
|---|---|---|---|---|
| 5,864,612 | A * | 1/1999 | Strauss et al. ............ | 379/142.03 |
| 6,028,921 | A * | 2/2000 | Malik et al. .............. | 379/201.04 |
| 6,188,683 | B1 * | 2/2001 | Lang .................... | H04M 7/0009 370/352 |
| 6,480,600 | B1 * | 11/2002 | Neyman et al. .......... | 379/265.09 |
| 6,621,895 | B1 * | 9/2003 | Giese ....................... | 379/201.03 |
| 6,779,020 | B1 * | 8/2004 | Henrick ........................ | 709/206 |
| 6,798,786 | B1 * | 9/2004 | Lo et al. ......................... | 370/468 |
| 7,342,917 | B2 * | 3/2008 | Mohan et al. .................. | 370/352 |
| 7,388,949 | B2 * | 6/2008 | Contractor et al. ...... | 379/142.06 |
| 7,463,724 | B2 * | 12/2008 | Ruckart ..................... | 379/88.21 |
| 7,586,898 | B1 * | 9/2009 | Koch et al. ..................... | 370/352 |
| 8,155,626 | B2 * | 4/2012 | Stille .......................... | 455/412.2 |
| 8,331,546 | B2 * | 12/2012 | Claudatos et al. ........ | 379/202.01 |
| 8,369,311 | B1 * | 2/2013 | Kirchhoff et al. ............. | 370/352 |
| 8,934,476 | B2 * | 1/2015 | Pulhug ......................... | 370/352 |
| 2002/0168055 | A1 * | 11/2002 | Crockett et al. ............ | 379/88.01 |
| 2003/0063590 | A1 * | 4/2003 | Mohan et al. .................. | 370/338 |
| 2003/0169866 | A1 * | 9/2003 | Williams et al. ......... | 379/220.01 |
| 2004/0196966 | A1 * | 10/2004 | Bushnell .................... | 379/88.19 |

(Continued)

*Primary Examiner* — Wutchung Chu
(74) *Attorney, Agent, or Firm* — Haynes and Boone LLP (57) ABSTRACT

A method includes receiving a query from an external entity for information about a call between a first user and a second user, determining a call identifier associated with the call and providing the call identifier to the external entity. Subsequently, when a request to alter the call and comprising the call identifier is received from the external entity, the call is altered the call in accordance with the request.

20 Claims, 4 Drawing Sheets

(56) References Cited

U.S. PATENT DOCUMENTS

| | | | |
|---|---|---|---|
| 2005/0113062 A1* | 5/2005 | Pelaez et al. | 455/405 |
| 2006/0095515 A1* | 5/2006 | Forstadius | 709/205 |
| 2006/0227947 A1* | 10/2006 | Benco et al. | 379/133 |
| 2007/0078948 A1* | 4/2007 | Julia et al. | 709/217 |
| 2007/0112964 A1* | 5/2007 | Guedalia | H04L 29/06027 709/227 |
| 2007/0152777 A1* | 7/2007 | Bouche et al. | 333/187 |
| 2007/0153999 A1* | 7/2007 | Daigle | 379/142.07 |
| 2007/0294354 A1* | 12/2007 | Sylvain | 709/206 |
| 2008/0025488 A1* | 1/2008 | Dean et al. | 379/201.11 |
| 2008/0317065 A1* | 12/2008 | Chen et al. | 370/469 |
| 2009/0006533 A1* | 1/2009 | Guo | 709/203 |
| 2009/0086947 A1* | 4/2009 | Vendrow | 379/201.12 |
| 2009/0094531 A1* | 4/2009 | Danieli et al. | 715/753 |
| 2009/0168985 A1* | 7/2009 | Yu et al. | 379/202.01 |
| 2011/0158223 A1* | 6/2011 | Liu et al. | 370/352 |
| 2011/0255530 A1* | 10/2011 | Chaturvedi et al. | 370/352 |
| 2013/0013735 A1* | 1/2013 | Kim et al. | 709/217 |

* cited by examiner

METHOD FOR AUGMENTING A VOICE CALL

FIELD OF THE DISCLOSURE

The present invention relates to a method for externally accessing call identifier information from a call server and utilizing such information to provide extended call functionality.

BACKGROUND

Existing web services, such as Parlay X MakeCall can be used to make a call from a first telephone to a second telephone, to add additional parties to the call or to add other media to existing calls, such as video media. However, in all such cases the call must be initiated from a web service interface in order to get a reference call identifier (CallID) number from the call server implementing the desired service. Subsequent actions, such as adding video to the call, are performed using the reference CallID. It is not possible with existing web services to modify or control a call that was not established by the web service such as standard voice calls placed from a first party to a second party.

Given the emergence of standards such as GSMA VideoShare, ImageShare and Rich Communication Suite (RCS), as well as the growing adoption of solutions combining multiple user devices (e.g., phone+computer, phone+TV, etc.), there is a need for a method enabling the addition of media and/or functionality to standard voice calls.

SUMMARY OF THE DETAILED DESCRIPTION

In accordance with an exemplary and non-limiting embodiment, a method comprises receiving a query from an external entity for information about a call between a first user and a second user, determining a call identifier associated with the call and providing the call identifier to the external entity.

In accordance with another exemplary and non-limiting embodiment, a method for augmenting a call between a first user and a second user comprises transmitting to a call server a query for information associated with the call wherein the query comprises an identifier of the first user, receiving from the call server information associated with the call and utilizing the information to augment the call.

In accordance with another exemplary and non-limiting embodiment, a service node comprises at least one communication interface, and a control system associated with the at least one communication interface and is adapted to transmit to a call server a query for information associated with the call wherein the query comprises an identifier of the first user, receive from the call server information associated with the call and utilize the information to augment the call.

In accordance with another exemplary and non-limiting embodiment, a call server comprises at least one communication interface and a control system associated with the at least one communication interface and is adapted to receive a query from an external entity for information about a call between a first user and a second user, determine a call identifier associated with the call, provide the call identifier to the external entity, receive from the external entity a request comprising the call identifier to alter the call and alter the call in accordance with the request.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

In accordance with various exemplary embodiments described below, a trusted external entity, such as a service node (SN) utilizes an application program interface (API) to query a call server for the call status of a call associated with a caller. The call may be identified based upon various parameters including, but not limited to, a phone number associated with either a calling or called device engaged in the call, an SIP address and the like. The API can return reference call data descriptive of the call including, but not limited to, status (e.g., setup, in progress, terminated, etc.), other involved parties, current media types in use, privacy settings, and the like. In addition, the API returns a reference callID that can be used by an external entity, such as the service node, to track or modify the call. Specifically, the reference call data and callID can be used by the external entity to provide different functions. For example, if the call server 12 is capable, it may be instructed by the external entity, referencing the callID, to add media to the call, to add a party, and/or to terminate the call. In an alternative embodiment, the external entity may use data associated with the retrieved call's parties to establish a parallel service between the parties in the call. For example, the external entity may setup a video session between the parties via computers operated by the respective parties via the internet.

Figure 1:
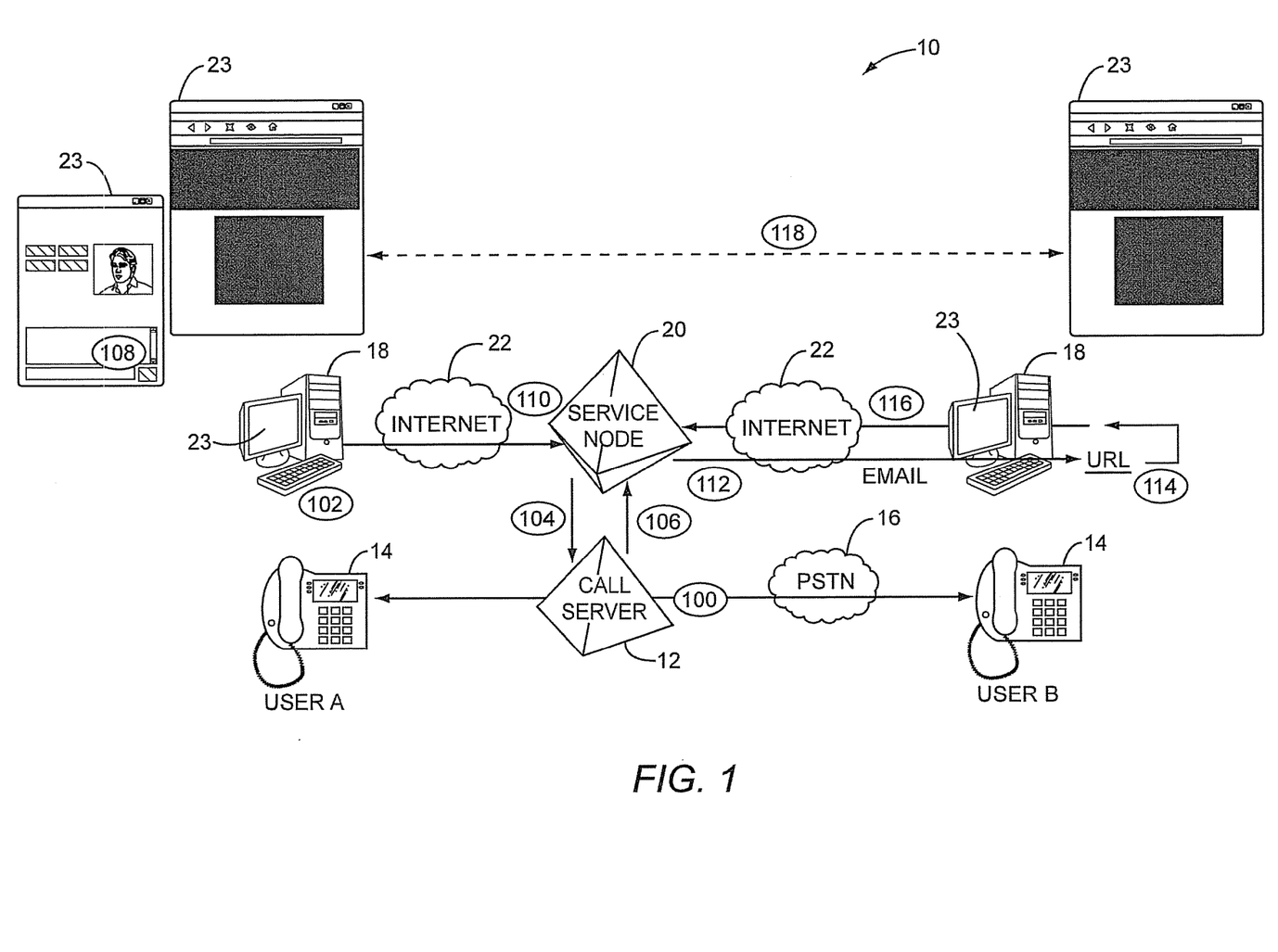
FIG. 1 is a block representation of a communication environment according to one embodiment of the disclosure.

Prior to delving into the details of select embodiments, an overview of an exemplary communication environment 10 is provided in association with FIG. 1. In general, a call server 12 is provided to facilitate communications among at least two communication devices 14. In an exemplary embodiment, the computer devices 18 are communicatively coupled via a service node 20 and communicate via a packet based network such as the internet 22. Service node 20 has stored upon it, or accessible to it, user profile information. User profile information may include, but is not limited to, a directory number (DN) associated with a user, a user login id, a user password, a user pictureID, presence status and the like.

Notably, the various devices 14, 18, may take virtually any form, including wired or wireless telephones, personal computers, personal digital assistants, and the like. The labels provided for these terminals in this description and the following claims are used only to improve readability and separately identify the terminals. As such, any of the devices 14, 18 may support a limited or full range of multimedia applications and communications, including voice. Alternatively, each communication device 14 may support primarily voice communications applications through packet or circuit switched connections.

In general, one embodiment of the present invention allows a first user who is associated with the communication device 14 to originate a call from the communication device 14 toward a second user using a communication device 14 associated with the second user. As used herein, "user A" refers to a user of a first communication device 14 acting as the initiator of a communication to another communication device 14 associated with another user. Further, "user B" refers to a user of a second communication device 14 who is further the intended recipient of a communication from user A. As a result, where appropriate, the term "user A" may be used interchangeably with "the user of the communication device 14" and "user B" may be used interchangeably with "the user of the communication device 14." During the following discussion wherein there is generally described the operation of the communication environment 10, there are illustrated various step designations (e.g., "step 100"). These step designations, referred to in the Specification, are intended to broadly indicate the flow of information described in the Specification and are illustrated in the figures as element numbers, wherein each element is associated with the step designation. For example, element number "100" in FIG. 1 is associated with "step 100" described below.

As illustrated, a voice call is initiated between the communication device 14 of user A and the communication device of user B via the call server 12 and PSTN 16 (step 100). In the present example, user A desires to add video media to the current voice call.

User A proceeds to log in and access a web portal hosted on the service node 20 via a browser 18B running on user A's computer 18 (step 102).

As a trusted node vis-à-vis communication with the call server 12, service node 20 queries the call server 12 via an application program interface (API). In an exemplary embodiment, the service node 20 accesses the directory number (DN) associated with user A in user A's user profile and passes the DN, via an API, as part of a request for the call status of any call currently in progress wherein the DN associated with user A is either a calling or called party (step 104). In response, the call server 12 utilizes the DN of user A's communication device 14 received in the API to determine the call status of any calls currently in progress involving the DN of user A. In the present example, as the communication device 14 of user A is involved in a call to the communication device 14 of user B, the call server 12 replies to the service node 20 with information including, but not limited to, a call status (e.g., "in progress"), the DN of the communication device of user B (DN B) and a reference callID uniquely defining the call between user A and user B (step 106).

Having received the information from the call server 12, the service node 20 functions as a web portal to present to user A the current call status such as on a browser 18B forming a part of user A's computer 18 (step 108). In addition to the call status, the service node 20 may access the user profile information and retrieve additional information for display to user A including, for example, current capabilities, such as video, SMS and the like. An exemplary browser 18B illustrating the presentation of a call status, as well as user B's pictureID and call options is displayed in detail at upper left. Such call options include, but are not limited to, "Video", "Redial", "WebPush", and "Hang Up".

In accordance with exemplary and non-limiting embodiments, the additional information displayed to user A may include a call duration, a list of the parties involved in the call, other contact information for the parties, an address, a current location, calendar/availability, and information indicative of the supported capabilities of the communication devices 14 involved in the call (e.g., video support, email support, instant messaging (IM) support, file transfer support). In addition, other call options may be displayed including an option to add or drop parties to a voice call. In such an instance, the parties to be added or dropped may be other people or may be service points, such as an interactive voice response (IVR), a recorder, a media streamer and the like.

In the present example, user A desires to engage in a video session with user B and operates the graphical user interface (GUI) of the browser 18B by selecting a call option, such as a "Video" button, to inform the service node 20 of user A's choice. In response to the selection, user A's request is sent to the service node 20 (step 110). Once received, the service node 20 accesses the user profile of user B to determine the best way to set up a video session based upon the capabilities of user B's communication device 14. In the present example, the service node 20 determines to enable video communication via the browsers 18B of the computer 18 of user A and the computer 18 of user B.

As noted above, user A is currently logged into the service node 20. In order to setup the video link, the service node 20 determines to provide user B a URL the operation of which will form a link to the service node 20. The service node then sends an invitation to user B to join a video session with user A (step 112). In an exemplary embodiment, the URL may be embedded in an email accessible by user B. User B's email address may be acquired by the service node 20 by accessing a user profile of either user A or user B or may be requested of user A via the browser 18B of user A.

Then, while maintaining the voice call between the communication devices 14 of user A and user B, user B accesses the email and retrieves the URL (step 114). Having received the URL, user B activates the URL resulting in the opening of a multimedia interaction GUI within browser 18B illustrated in proximity to the computer of user B (step 116). Shortly thereafter, the service node 20, having established communication with the computer of user B, updates the browser 18B of user A and enables multimedia services between user A and user B via their respective browsers 18B (step 118). Specifically, the service node 20 enables the transmission and reception of video between the computers of user A and user B. The updated browser 18B of user A is illustrated in communication with the browser of 18B of user B annotated with "step 118".

As a result, user A and user B are able to continue their voice conversation between their respective communication devices 14 via the call server 12 while simultaneously exchanging video media between their respective computers 18. Note that in the preceding example the service node 20 operates to establish a conduit for the exchange of video media via an internet connection in parallel to an existing voice connection. In accordance with exemplary embodiments discussed more fully below, the service node 20 may also operate to instruct the call server 12 to augment or otherwise alter an existing voice call.

Figure 2A:
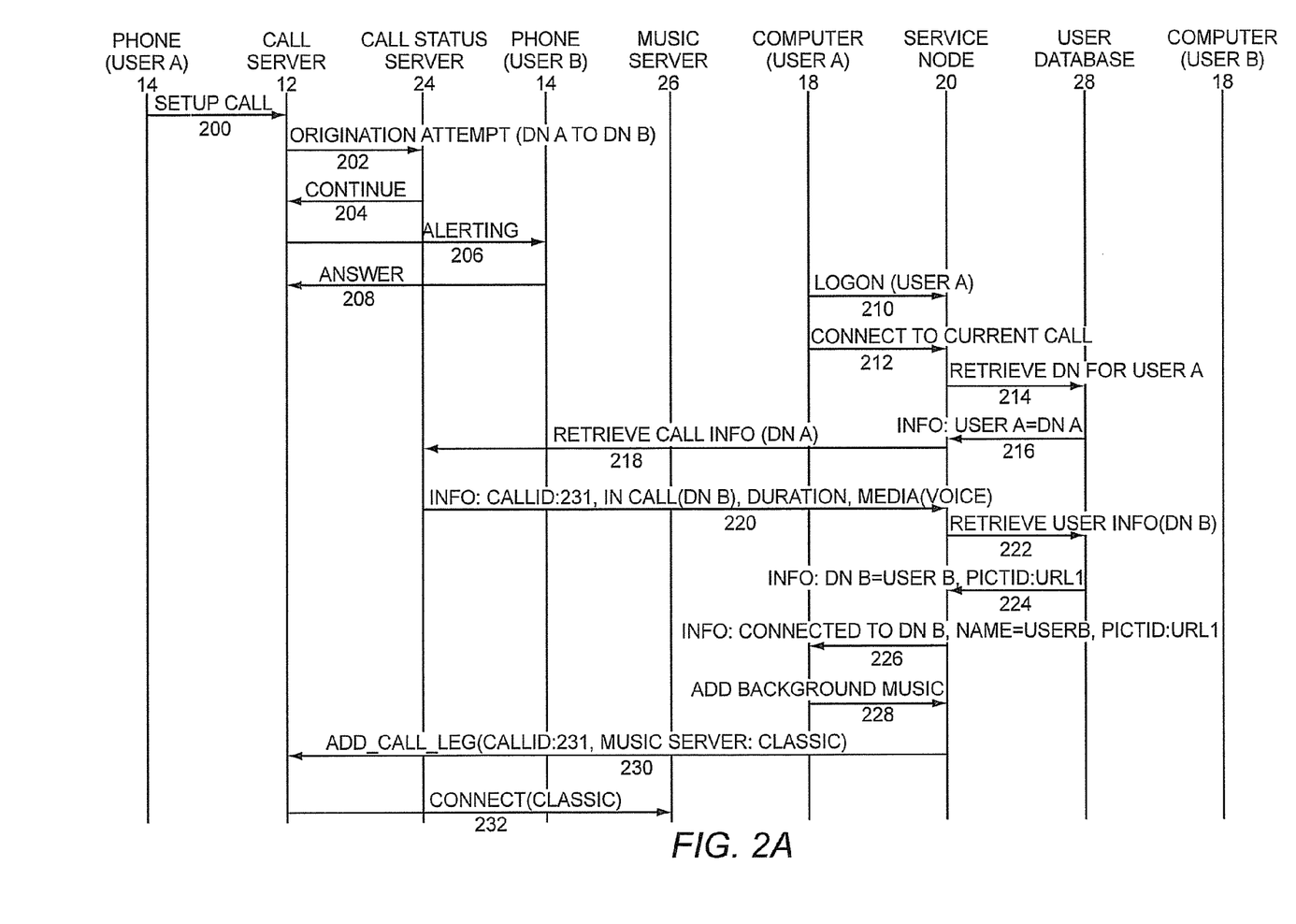
FIGS. 2A and 2B provide an exemplary communication flow according to one embodiment of the disclosure.
Figure 2B:
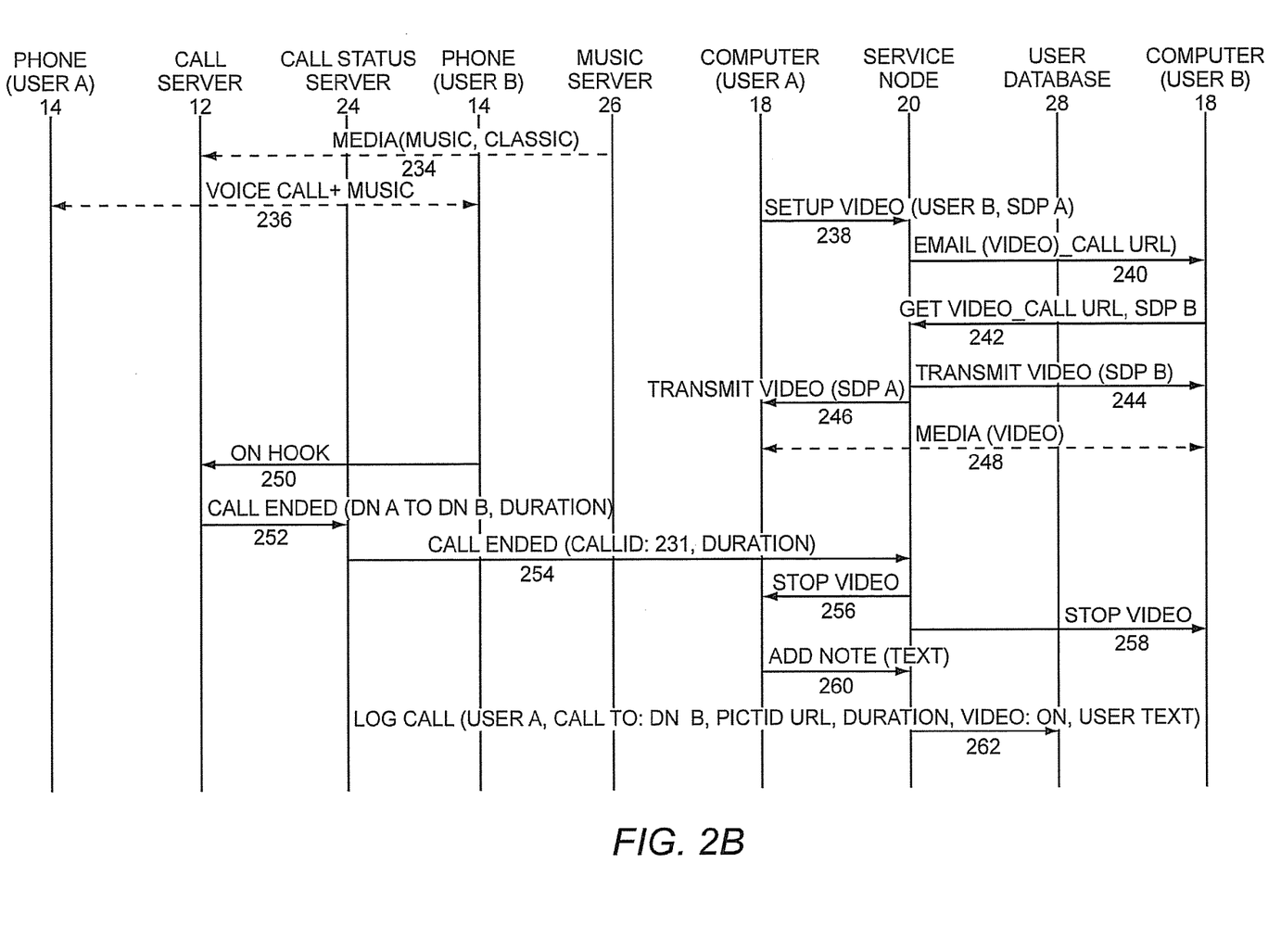

With reference to FIGS. 2A and 2B, a communication flow is provided to illustrate an exemplary scenario for utilizing the service node 20 to augment an existing voice call between user A and user B. Those skilled in the art will recognize that this is only an exemplary scenario according to one embodiment disclosed herein, and the aspects and elements represented in the communication flow are not all deemed necessary for implementation of the present invention. In particular, the communication flow is intended to illustrate numerous optional aspects and features that are supplemental to the core concepts of the embodiments disclosed herein. For purposes of clarity, the communication device 14 of user A associated with DN A is labeled "Phone (user A) 14". Likewise the communication device 14 of user B associated with DN B is labeled "Phone (user B) 14". Similarly, the computer 18 of user A is labeled "computer (user A) 18" and the computer 18 of user B is labeled "computer (user B) 18". There is additionally illustrated a call status server 24. The call status server 24 operates to maintain information related to the status of calls enabled by the call server 12. In accordance with exemplary embodiments, the call status server 24 may be an adjunct processor communicatively coupled to the call server 12 or may form a part of the call server 12. The music server 26 operates to receive requests from the call server 12 for audio media corresponding to one or more musical selections and to provide such audio media to the call server 12. The user database 28 operates to store user profile information and to provide user profile information to the service node 20 as requested. In exemplary embodiments, the user database 28 may form a part of the service node 20.

At some point, the user A decides to initiate a call from the phone (user A) 14 to the phone (user B) 14 using the directory number DN B (step 200). Specifically, the phone (user A) 14 directs the call to the call server 12. Upon receipt at the call server 12, the call server 12 informs the call status server 24 of an attempt to originate a call between DN A and DN B (step 202). In response, the call status server 24 replies to the call server 12 with an instruction to continue (step 204). The call server 12 then continues by alerting the phone (user B) 14 of the call request from phone (user A) 14 (step 206). In general, user B's phone does not need to be directly served by call server 12 and could be any phone connected to the PSTN or similar communication networks such as 3GPP IMS. Once alerted to the incoming call, such as by ringing of the phone (user B) 14, user B answers the phone (user B) 14 and the call server 12 is informed that user B has answered the phone (user B) 14 thus establishing a voice call between user A and user B (step 208).

Next, user A, operating the computer (user A) 18, logs onto the service node 20 (step 210). As discussed above, the logon procedure may involve a request to the service node 20 from the computer (user A) 18 including a userid and a password. Once logged on, user A transmits a request, such as via a browser 18B, to the service node 20 to establish a connection with a current call involving user A (step 212). In order to obtain information from the call server 12 associated with a current call involving user A, the service node needs to ascertain the DN associated with user A as the DN provides the key by which the call server 12 accesses information associated with calls. Therefore, the service node 20 queries user database 28 for the DN associated with user A (step 214). The user database 28 accesses, for example, user profile information, associates user A with DN A, and returns the information thus retrieved to the service node 20 (step 216).

Now in possession of user A's DN, DN A, the service node 20 queries the call status server 24, such as via an API, to retrieve call information associated with DN A (step 218). As noted above, in accordance with an exemplary embodiment, the call status server 24 forms a part of the call server 12 and, in such case, communication with the call status server 24 is achieved via communication with the call server 12. Using DN A as a search criteria, the call status server 24 returns call information associated with DN A including, for example, a unique callID, a status of the call, a duration, and a media descriptor (step 220). In the present example, the callID is "231", the status "In call(DN B)" indicates that the call is in progress with DN B, and the media descriptor identifies the call as a voice call.

Using the information returned from the call status server 24, the service node 20 queries the user database 28 for information associated with DN B (step 222). In the present example, the user database 28 is able to associate DN B with the userid of user B, a pictureID for user B, and a URL at which user B may be contacted. The user database 28 returns this information to the service node 20 (step 224).

The service node 20 proceeds to communicate the received information to the computer (user A) 18 (step 226). In the present example, information regarding the call status, the userid of user B and a picture of user B is sent to the computer (user A) 18 for display upon the browser 18B of user A as illustrated in FIG. 1.

In the present example, it is assumed that one of the options provided to user A for selection on the browser 18B is an option to add background music to the current voice call between user A and user B. User A's selection of this option is transmitted to the service node 20. In response, the service node 20 utilizes an API to instruct the call sever 12 to add background music to the call (step 230). Specifically, the service node 20 utilizes an API "AddCallLeg" and passes as parameters the callID and a parameter indicating that the music server is to return an audio stream comprising "classic" music.

The call server 12 proceeds to transmit a request to the music server 26 requesting music of a classic nature (step 234). In response to the request from the call server 12, the music server 26 returns an audio stream comprising classic music to the call server 12 (step 234). Having acquired access to the streaming audio of the music server 26, the call server 12 combines the received audio stream with the existing voice traffic between phone (user A) 14 and phone (user B) 14 and enables the transmission of the resulting audio stream between user A and user B (step 236).

There has therefore been illustrated a method by which an external entity such as the service node 20 is able to gain access via an API to information accessible to the call server 12 and to use such information to augment or otherwise alter an existing voice call. For example, the API, referring to the callID, could be used to add other parties to the call, transfer the call, put the call on hold, send a message to a user, etc.

In accordance with another exemplary embodiment, user A selects an option, such as on user A's browser 18B, to engage in an exchange of streaming video between the computer (user A) 18 and the computer (user B) 18. Specifically, the computer (user A) 18 transmits a request utilizing Session Description Protocol (SDP) to the service node 20 to request the initiation of streaming video between the computer (user A) 18 and the computer (user B) 18 (step 238). In response to the request, the service node 20 emails user B at an email address associated with user B, such as may be retrieved to form user B's user profile, and provides a URL at which user B may enable a video stream from the computer (user A) 18

(step 240). When user B access the email and selects the URL, a request to begin the streaming video is sent to the service node 20 (step 242). Having thus received confirmation that both user A and user B wish to exchange streaming video, the service node transmits instructions to both the computer (user B) 18 (step 244) and the computer (user A) 18 (step 246) to commence to transmit video. Having enabled the flow of video media between the computer (user A) 18 and the computer (user B) 18, the service node 20 enables the transmission of a video stream between the computer (user B) 18 and the computer (user A) 18 (step 248).

In the present example, the phone (user B) 14 hangs up to terminate the call and a message is transmitted to the call server 12 to indicate that the phone (user B) 14 is on hook (step 250). In response, the call server 12 informs the call status server 24 that the call from DN A to DN B has terminated and supplies the duration of the call (step 252). The call status server 24 utilizes an API to inform the service node 20 that the call has terminated and supplies the callID and the duration (step 254). In response, the service node 20 stops the streaming video to the computer (user A) 18 (step 260) and the computer (user B) 18 (step 258).

In an exemplary embodiment, a user, such as user A, may wish to provide an annotation, such as text, to the service node 20 to be included in a log of the call (step 260). The text may then be used by the service node 20 to optionally transmit a command to store a call log of the call including, for example, the caller, the recipient, a picture ID, a URL, a call duration, an augmentation parameter describing alterations to the voice call and text annotation.

In addition to the above described exemplary and non-limiting embodiments, various other augmentations to an existing phone call may be performed. For example, in addition to adding video media to a call as described above, the above described method may likewise be employed to transfer files, to share images, to engage in web co-browsing, to stream audio media, to message and the like. Further, while there is described above augmenting a voice call between two communication devices 14 with additional data collected by at least one external computer 18, the additional data may be collected by a communication device 14 utilized for voice communication such as, for example, an SIP softclient.

While described above in accordance with exemplary and non-limiting embodiments wherein one or more APIs are utilized to access information regarding a current call, APIs may likewise be utilized with regard to a previous or most recent call by a party wherein the previous call may have an expiration time. While the APIs described may be custom coded to perform the method steps described above, standard APIs including, but not limited to, 3GPP 29.199-11 could be updated to implement the required API.

Figure 3:
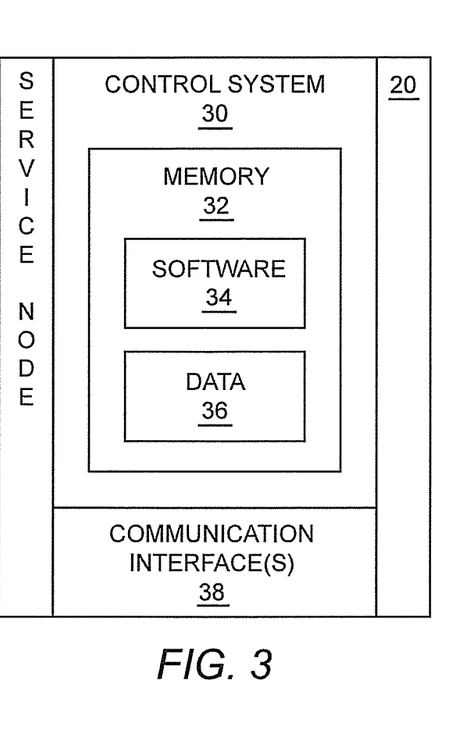
FIG. 3 is a block representation of a service node according to one embodiment of the disclosure.

With reference to FIG. 3, a block representation of the service node 20 is illustrated according to one embodiment. The service node 20 may include a control system 30 having sufficient memory 32 for the requisite software 34 and data 36 to operate as described above. The software 34 may provide the communication function, web server function, and interworking function, which are described above. The control system 30 may also be associated with one or more communication interfaces 38 to facilitate communications with the various entities illustrated in the communication environment 10, as well as any other entities being used during the implementation of the present invention.

Figure 4:
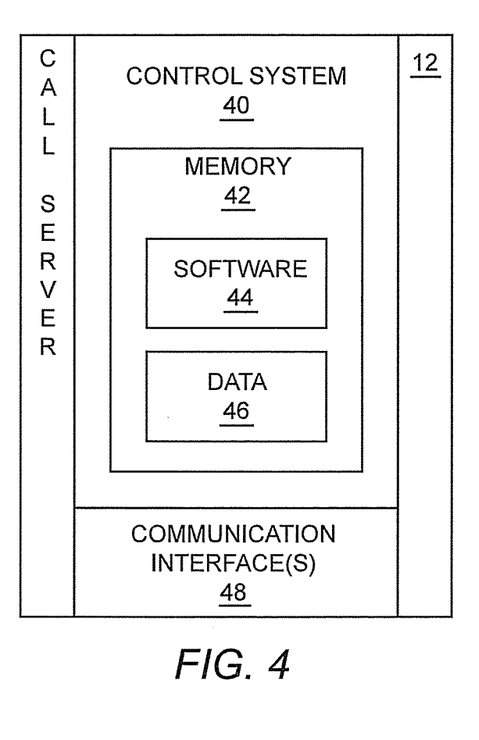
FIG. 4 is a block representation of a call server according to one embodiment of the disclosure.

With reference to FIG. 4, a block representation of a call server 12 is illustrated. The call server 12 may include a control system 40 having sufficient memory 42 for the requisite software 44 and data 46 to operate as described above.

The control system 40 may be associated with one or more communication interfaces 48 to facilitate communications as described above.

Those skilled in the art will recognize improvements and modifications to the embodiments of the present invention. All such improvements and modifications are considered within the scope of the concepts disclosed herein and the claims that follow.

What is claimed is:

1. A method comprising:
receiving a request from a computing device associated with a first user, the request being to connect to an established call between the first user and a second user;
in response to the request, transmitting to a call server a query for information associated with the established call, wherein the call server is associated with the established call between the first user and the second user, wherein the query comprises an identifier of the first user involved in the call;
receiving from the call server information associated with the call, wherein the information associated with the call comprises a caller identifier of the second user and the caller identifier is used to retrieve an alternate communication address for the second user associated with a computing device of the second user; and
utilizing the information to augment the call, wherein utilizing the information comprises:
determining at least one option for augmenting the call based upon the capabilities of the second user;
presenting the at least one option to the first user
receiving a selection of one of the at least one option from the first user; and
augmenting the call based upon the selection, wherein augmenting the call comprises: transmitting a Universal Resource Locator (URL) to the second user, forming a communicative coupling with the second user in response to the second user accessing the URL, and establishing communication between the first user and the second user.

2. The method of claim 1 wherein the information comprises a call identifier and wherein utilizing the information comprises transmitting to the call server an instruction to augment the call the instruction comprising the call identifier.

3. The method of claim 2 wherein the instruction comprises an instruction to add a party to the call.

4. The method of claim 2 wherein the instruction comprises an instruction to drop a party from the call.

5. The method of claim 2 wherein the instruction comprises an instruction to add a media stream to the call.

6. The method of claim 5 wherein the media stream comprises at least one of an audio stream and a video stream.

7. The method of claim 1 wherein transmitting the query comprises transmitting the query via an application program interface (API).

8. The method of claim 1 wherein the capabilities of the second user are stored in a user profile.

9. The method of claim 1 wherein the communication is via a packet based network.

10. A service node comprising:
at least one communication interface; and
a control system associated with the at least one communication interface and adapted to:
receive a request from a computing device associated with a first user, the request being to connect to an established call between the first user and a second user;

in response to the request, transmit to a call server a query for the information associated with the established call, wherein the call server is associated with the established call between the first user and the second user, wherein the query comprises an identifier of the first user involved in the call, further wherein the call with the first user includes an established voice call between the first user and the second user over a Public Switched Telephone Network (PSTN);

receive from the call server the information associated with the call; and utilize the information to augment the call.

11. The service node of claim 10 wherein the information comprises a call identifier and wherein the control system is adapted to transmit to the call server an instruction to augment the call the instruction comprising the call identifier.

12. The service node of claim 10, wherein to utilize the information to augment the call, the control system is further adapted to:

determine at least one option for augmenting the call based upon the capabilities of the second user;

present the at least one option to the first user;

receive a selection of one of the at least one option from the first user; and augment the call based upon the selection.

13. The service node of claim 12, wherein to augment the call based upon the selection, the control system is further adapted to transmit a Universal Resource Locator (URL) to the second user, forming a communicative coupling with the second user in response to the second user accessing the URL, and establishing communication between the first user and the second user.

14. The service node of claim 13, wherein to utilize the information, the control system is further adapted to transmit to the call server an instruction to augment the call.

15. The service node of claim 13, wherein the instruction comprises an instruction to add or drop a party from the call.

16. The service node of claim 13, wherein the instruction comprises an instruction to add a media stream to the call.

17. The service node of claim 16, wherein the media stream comprises at least one of an audio stream and a video stream.

18. A method performed by a service node, the method comprising:

receiving a request from a computing device associated with a first user, the request being to connect to an established call between the first user and a second user;

in response to the request, transmitting to a call server a query for the information associated with the established call, wherein the call server is associated with the established call between the first user and the second user, wherein the query comprises an identifier of the first user involved in the call, further wherein the call with the first user includes an established voice call between the first user and the second user over a Public Switched Telephone Network (PSTN);

receiving from the call server the information associated with the call; and utilizing the information to augment the call.

19. The method of claim 18, wherein the information comprises a call identifier.

20. The method of claim 18, wherein utilizing the information comprises transmitting to the call server an instruction to augment the call, the instruction comprising the call identifier.

* * * * *